United States Patent [19]
Butts

[11] 3,742,639
[45] July 3, 1973

[54] FISH HOOK DEVICE
[76] Inventor: LaVerne D. Butts, Minnewaukan, N. Dak. 58351
[22] Filed: Aug. 17, 1971
[21] Appl. No.: 172,427

[52] U.S. Cl.............. 43/42.39, 43/43.14, 43/44.2
[51] Int. Cl. .................. A01k 83/06, A01k 85/00
[58] Field of Search............ 43/42.39, 43.1, 43.14, 43/43.15, 44.2, 44.8

[56] References Cited
UNITED STATES PATENTS

| | | | |
|---|---|---|---|
| 3,193,963 | 7/1965 | Roedel | 43/42.39 |
| 1,789,630 | 1/1931 | Knight | 43/42.39 X |
| 2,605,574 | 8/1952 | Rolf | 43/42.39 |
| 2,924,907 | 2/1960 | Hamilton | 43/43.15 X |
| 2,795,076 | 6/1957 | Luft | 43/42.39 |

Primary Examiner—Louis G. Mancene
Assistant Examiner—Daniel J. Leach
Attorney—Robert E. Kleve

[57] ABSTRACT

A fish hook device comprising a plate member with a hook extending horizontally therefrom and detachably mounted thereto for attaching a bait fish to the stem of the hook. The plate member has a plurality of bores along the top for adjustably attaching a fish line thereto. The plate also has a plurality of bores along its lower edge for adjustably attaching a weight thereto. The adjustment bores are provided to balance the plate member in the water with the stem of the hook extending horizontally.

3 Claims, 4 Drawing Figures

PATENTED JUL 3 1973          3,742,639

INVENTOR
LAVERNE D. BUTTS

BY *Robert E. Kleve*

ATTORNEY

FISH HOOK DEVICE

This invention relates to fishing equipment, more particularly, the invention relates to fish hook equipment.

It is one object of the invention to provide a novel fish hook device for still fishing which is balanced in the water and which has a hook at its forward end which is caused to pivot downward into the mouth of the fish.

It is another object of the invention to provide a novel fish hook device for fishing which balances the bait horizontally in the water, and provides a more effective hooking action.

It is a further object of the invention to provide a novel fish hook device for still fishing which provides a more effective lure and fish hook device.

Further objects and advantages of the invention will become apparent as the description proceeds and when taken in conjunction with the accompanying drawing wherein.

Briefly stated, the invention comprises a fish hook device for still fishing having a plate member with a hook extending horizontally from the plate and detachably mounted to the plate, a plurality of openings provided along the top of the plate for adjustably attaching the fish line thereto, and a plurality of openings provided along the rear of the plate for adjustably attaching weights thereto to balance the plate member in the water, said hook being detachable from the plate to attach a bait fish to the hook to extend horizontally along the hook.

Figure 1:
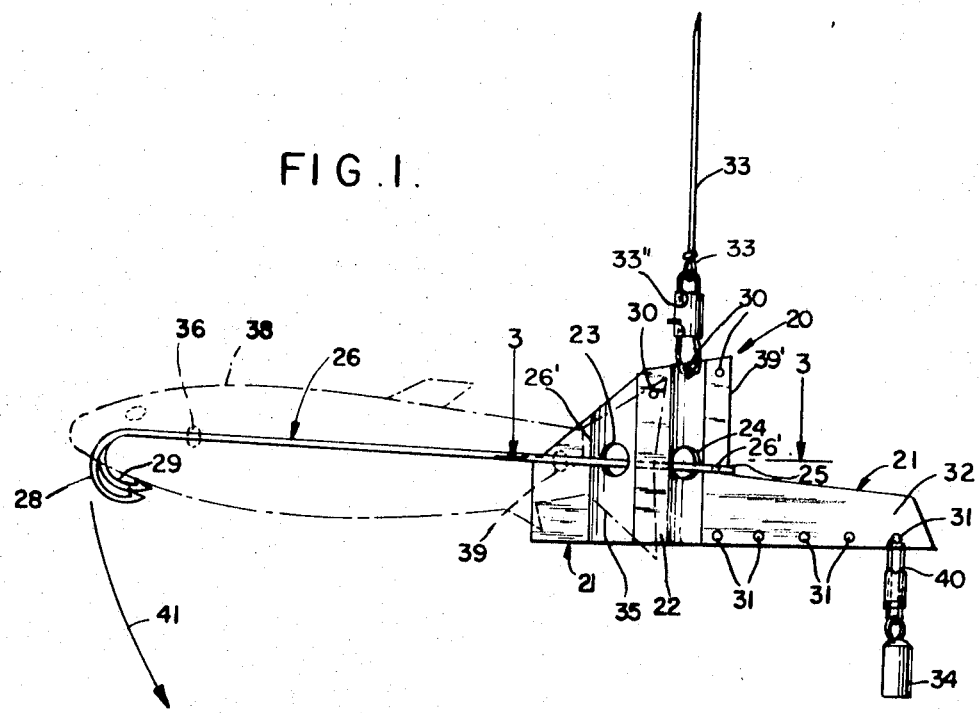
FIG. 1 is a side elevational view of the fish hook invention.
Figure 2:
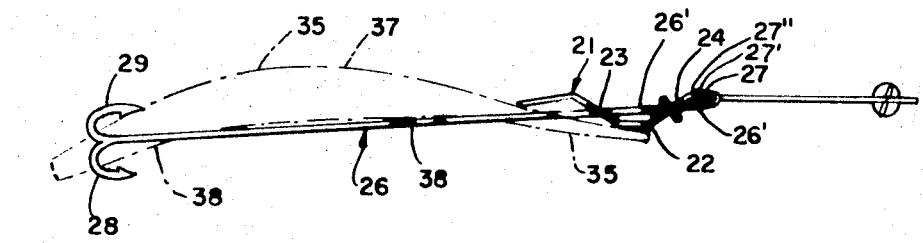
FIG. 2 is a top plan view of the fish hook invention.
Figure 4:
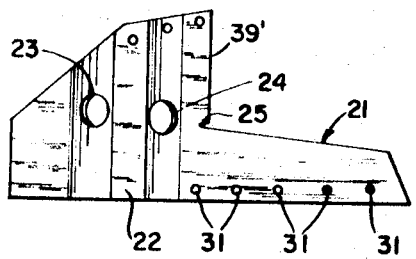
FIG. 4 is a side elevational view of the plate member with the hook, fish line and weight detached.
Figure 3:
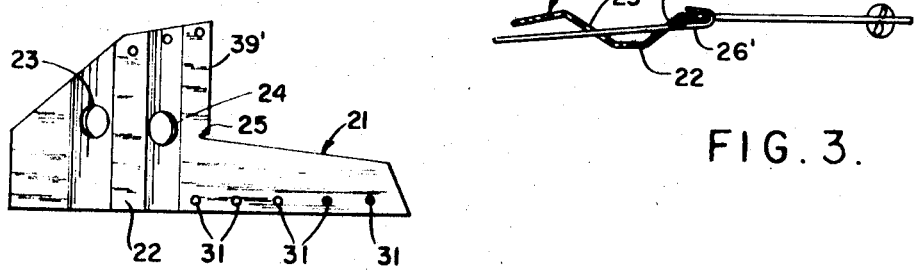
FIG. 3 is a cross sectional view of the fish hook invention taken along line 3—3 of FIG. 1.

Referring more particularly to the drawing in FIG. 1 and 2 the fish hook invention 20 is illustrated having a metal plate 21. The metal plate has a zig-zag fold 22 therein, with a pair of bores 23 and 24, and a notched edge portion 25 for receiving the stem 26' of a hook member 26. The hook member 26 has a V-shaped fold 27 at its rearward end and a pair of conventional fish hooks 28 and 29 at its forward end.

The plate member 24 has a plurality of bores 30 along its top and a plurality of bores 31 along its rearward lower portion 32. A fish line 33 is attached at its lower end 33' to a clip member 33'' and the clip member 33'' is attached to one of the bores 30. A weight member 34 is attached to one of the bores 31.

The hook member 26 is detached from the plate member 24 by sliding the hook member from left to right when viewed in FIGS. 1 and 2, to detach the V-shaped folded end 27 of the stem of the hook from the notch 25 in the metal plate 21. Whereupon the hook member is rotated 90 degrees about a longitudinal axis of the stem, to position the V-shaped fold 27 so as to be either above or below the straight portion 26' of the stem. The hook and stem may then be slid from right to left out of the bores 23 and 24 in the plate member 21, when viewed in FIG. 1.

Once the hook member 26 is detached from the plate 21, the operator will place bait fish, shown in phantom lines in FIG. 1 and 2 and designated by numeral 35, on the fish hook 26 by piercing one side 37 of the bait fish at the location indicated by numeral 36, passing the stem 26' of the hook through the bait fish from the said side 37 and then along the opposing side 38 and piercing the side 38 of the fish at location 39 to run the stem 26' back to the side 37 of the bait fish and then beyond the tail 33 of the fish to its position, relative to the bait fish 35, as shown in FIGS. 1 and 2.

Once the bait fish 35 has been attached to the fish hook 26, as shown in FIG. 1 and 2, the fish hook will be reattached to the plate member 21 by sliding the V-shaped end 27 of the stem through the bores 23 and 24 from left to right when viewed in FIG. 1 and 2 with the leg 27' of the V-shaped end pivoted upward. The V-shaped end 27 is then moved past the rear edge 39' of the central upright portion of the plate member 21 and the fish hook 26 is rotated to place end 27 in the position seen in FIG. 1 and 2. The fish hook is then moved from right to left as viewed in FIG. 2, to hook the V-shaped end 27 onto the edge 39' of the plate member in the notch, where friction will retain the V-shaped end 27 in the notch.

The width of the bait fish 38, when viewed in FIG. 2, will be sufficient to bow the stem 26' slightly out of alignment, to urge the stem 26' against the sides of the bores 23 and 24 in the plate member 24 to frictionally retain stem 26' onto the plate 21 with the bait fish 35 thereon.

Once the bait fish 35 has been attached to the stem 26' of the hook member, and the stem 26' of the hook member has been attached to the plate 21, the operator will balance the fish hook device 20, by placing the conventional snap pin 40, which is attached to the top of the weight member 34, to one of the bores 31 in the plate 21 and may at this time hold the plate member up by the fish line 33 to determine if the entire assembly will balance with the stem 26' and the bait fish extending horizontally as shown in FIG. 1. The operator may also shift the fish line 33 to any of the other of the bores 30 in the top of the plate member 21 to achieve this balance.

OPERATION

The fish hook device 21 will be lowered into the water, with the hook member 26 having the bait fish attached thereto, and with the hook member 26 attached to the plate member 21, and with the entire assembly balanced, so that when the hook device is suspended in the water the bait fish 35 will be positioned generally horizontal, which makes the bait fish look more lifelike.

If a fish grasps at the bait fish 35 with its mouth the entire device including the hooks will be pivoted downward in a counter clockwise direction when viewed in FIG. 1 as indicated by the arrow 41, about the axis of the lower end 33' of the fish line 33, which will cause the fish hooks to engage into the bottom of the mouth of the fish where there is more flesh in the fish for the hook to engage in for more effective hooking of the fish to the hooks 28 and 29 of the fish device.

Thus, it will be seen that a novel still fishing hook device has been provided which enables a bait fish to be attached to the device so that the bait fish will be suspended horizontally in the water to give a more life like appearance to the bait fish, and which has a downward pivoting hooking action to engage the bottom of the mouth of the fish for a more effective hooking action.

It will be obvious that various changes and departures may be made to the invention without departing from the spirit thereof and accordingly it is not intended that the invention be limited to that specifically described in the specification or as illustrated in the drawing, but only as set forth in the appended claims wherein:

What is claimed is:

1. A fish hook device for still fishing comprising a plate member adapted to have a fish line attached to its upper edge portion, a detachable fish hook having an elongated stem to receive a bait fish thereon, said plate member having means to detachably receive and retain the fish hook with the bait fish attached to the fish hook stem, means to balance the hook device with the bait fish and hook attached thereon, so that the bait fish on the hook device will extend horizontally when the fish hook device is suspended in the water.

2. A fish hook device for still fishing comprising a plate member adapted to have a fish line attached to its upper edge portion, said plate member having zig-zag folds with a pair of bores therethrough defining horizontal passageway means, a detachable fish hook having an elongated stem adapted to receive a bait fish thereon with the bait fish mounted longitudinally along the said stem, said passageway means of said plate member detachably receiving and retaining said fish hook to attach said hook to said plate member, means to balance the hook device with the bait fish and hook attached thereon, so that the bait fish will extend horizontally when the fish hook device is suspended in the water.

3. A fish hook device according to claim 2 wherein said balance means is adjustable.

* * * * *